United States Patent [19]

Freudenmann et al.

[11] Patent Number: 4,682,748
[45] Date of Patent: Jul. 28, 1987

[54] ONE-PIECE CLIP-SHAPED HOLDER FOR ELONGATED ARTICLES

[75] Inventors: Kurt Freudenmann; Heiner Wiese, both of Hamburg, Fed. Rep. of Germany

[73] Assignee: ITW Ateco, Norderstedt, Fed. Rep. of Germany

[21] Appl. No.: 796,420

[22] Filed: Nov. 8, 1985

[30] Foreign Application Priority Data

Dec. 17, 1984 [DE] Fed. Rep. of Germany ....... 3445935

[51] Int. Cl.[4] .............................................. F16L 3/12
[52] U.S. Cl. .................................. 248/73; 248/205.3; 248/74.4
[58] Field of Search ....................... 248/73, 74.3, 74.2, 248/205.3, 70, 74.4, 74.5

[56] References Cited

U.S. PATENT DOCUMENTS

| | | | |
|---|---|---|---|
| 3,126,184 | 3/1964 | Kropp | 248/73 |
| 3,672,615 | 6/1972 | Fiorentino | 248/74.3 |
| 4,131,258 | 12/1978 | Okuda et al. | 248/74.2 X |
| 4,272,047 | 6/1981 | Botka | 248/74.3 |
| 4,478,381 | 10/1984 | Pittion et al. | 248/71 |
| 4,572,466 | 2/1986 | Yamaguchi et al. | 248/73 |
| 4,609,171 | 9/1986 | Matsui | 248/78.4 |

FOREIGN PATENT DOCUMENTS

| | | | |
|---|---|---|---|
| 18407 | 9/1899 | United Kingdom | 248/73 |
| 1338325 | 11/1973 | United Kingdom | 248/74.2 |
| 1600605 | 10/1981 | United Kingdom | 248/74.3 |

Primary Examiner—Ramon S. Britts
Assistant Examiner—Karen J. Chotkowski
Attorney, Agent, or Firm—John P. O'Brien; Thomas W. Buckman

[57] ABSTRACT

A one-piece clip-shaped holder of synthetic material for fixing elongated articles such as cables, pipes or the like, comprising a socket adapted to be connected to an underground, a bracket pivotally connected to the socket, an arresting tooth arranged at the free end of the socket and engaging behind an arresting surface at the socket spaced through a distance from the point of pivotal connection of the bracket, and an arcuate guiding portion which engages within a guiding recess, when the arresting tooth engages behind the arresting surface, with an arcuate segment formed integrally at the socket spaced through a distance from the point of pivotal connection of the bracket, which is provided with a toothing on one side thereof forming several arresting surfaces, and with an opening formed at the bracket, through which the tooth segment is adapted to be passed and fixed with the aid of the arresting tooth associated with the opening.

5 Claims, 7 Drawing Figures

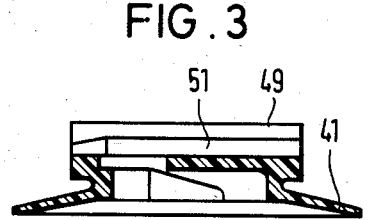
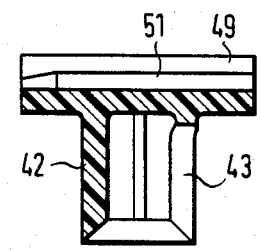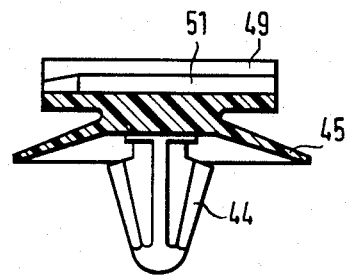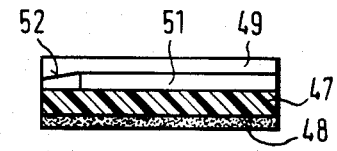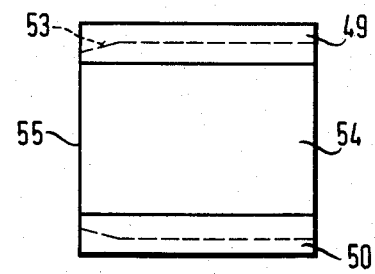

ONE-PIECE CLIP-SHAPED HOLDER FOR ELONGATED ARTICLES

The invention relates to a one-piece clip-shaped holder of synthetic material for fixing elongated articles such as cables, pipes or the like, comprising a base portion adapted to be connected to a support member, a bracket pivotally connected to the base portion, an arresting tooth arranged at the free end of the bracket, gripping behind an arresting surface at the base portion spaced through a distance from the point of pivotal connection at the bracket, and an arcuate guiding portion engaging within a guiding recess when the arresting tooth engages the arresting surface.

Such a holder is known (German utility model No. 74 32 462). It comprises one or several bifurcated reception means, in which an elongated article such as a cable may be placed. An arcuate bracket is pivotally connected to one leg of the reception means via a film hinge, said bracket being provided at the other end with an arresting tooth. The arresting tooth grips behind an arresting surface on the outside of the other leg.

It is also known in connection with the above mentioned holder to form an arcuate guiding extension at the bracket which engages within a recess formed in the base portion, when the bracket is brought into closing position. The bracket prevents the hinge from becoming too strongly loaded and constitutes a guide for the bracket, when it is placed around the elongated article and arrested.

The known holder suffers from some disadvantages. It is essentially dimensioned only for one diameter of the article to be accommodated. Articles of smaller diameter cannot be immovably fixed. Articles of greater diameter can no longer be enclosed by the bracket. The weakest point of the known holder is the hinge joint. If the bracket at this point breaks off the base portion, the accommodated articles will no longer be safely retained.

It is therefore the object of the invention to provide a one-piece clip-shaped holder of synthetic material for fixing elongated articles such as cables, pipes or the like, which may be used for different diameters of one single article or a bundle of elongated articles.

This object is attained in accordance with the invention in that there is an arcuate segment formed integrally with the base portion spaced through a distance from the point of pivotal connection of the bracket, said segment having at one side thereof a toothing forming several arresting surfaces, with an opening formed at the bracket through which the tooth segment may be passed and fixed with the aid of the arresting tooth associated with the opening.

In the case of the holder according to the invention the arcuate tooth segment extends upward from the base. The toothing may be formed on the side of the tooth segment facing the bracket. It may furthermore be formed at one or both of the outside surfaces of the tooth segment. To be preferred, however, is a toothing on the backside of the tooth segment. In the closing position the tooth segment extends by a greater or lesser extent through the opening in the bracket. The individual teeth of the tooth segment form steps, by which the bracket approaches the base in a greater or lesser extent. The first and the last tooth of the tooth segment respectively form the limit for the maximum and minimum diameter of the article to be accommodated and for a bundle of articles, respectively, to be accommodated with safe accommodation by the holder according to the invention. The holder according to the invention, therefore, may be adjusted to the most different diameters of articles to be accommodated. It reduces, thus, the storekeeping of different sizes of holders for different diameters.

Tooth segment and bracket are preferably designed to be relatively stiff, so that an irreproachable arresting is obtained, secure against inadvertent loosening.

It is clear that the arresting tooth is arranged on that side of the opening formed in the bracket, on which the toothing is formed at the tooth segment. It is within the scope of the invention to form a rigid tooth at the bracket pointing into the opening. It is, however, to be preferred if, according to one embodiment of the invention, the arresting tooth is formed at a pawl lever which is pivoted to the bracket via a torsional portion in such a manner that the arresting tooth as a result of the torsional tension in the torsional portion gets into co-operation with the tooth segment. The torsional portion may be designed in such that it enables an easy pivotal movement of the pawl lever. Upon pivotal movement of the bracket over the tooth segment the arresting tooth will thereby slide along the toothing in a ratchet operation, until the bracket comes to lie in close contact against the accommodated article. The arresting tooth is thereupon fixed behind the last-skipped tooth of the toothing of the tooth segment. The torsional tension takes care that the tooth engagement is constantly under bias. The bias, however, is not based only on the torsional tension, but also on the pressure exerted by the bracket on the arresting tooth when lying in close contact more or less under tension against the accommodated article.

The connection of the pawl lever under normal working load, however, is stressed on bending but not on torsion, so that a safe and irreproachable interlocking engagement may be obtained. On the other hand, it may be easily opened, even if the bracket lies against the accommodated article under high pressure. Upon the pivotal movement of the pawl lever what has to be overcome beside the torsion of the connection essentially is the frictional force between the arresting tooth and the respective tooth flank at the tooth segment.

In another embodiment of the invention provision is made for the pawl lever to extend from the bracket on the side facing away from the base. In this embodiment, a self-reinforcing effect of the interlocking engagement is obtained, because any contact with the pawl lever and forces, respectively, effecting on the pawl lever will lead to a reinforcement of the interlocking effect.

In order to obtain an easy interlocking engagement and loosening of the holder according to the invention, without impairing the interlocking engagement, provision is made in one embodiment of the invention for the teeth of the tooth segment to have one long flat flank and one steep short flank and for the flank of the arresting tooth facing the opening to extend approximately in the same direction as the flat flank of the teeth of the tooth segment.

It has already been explained that it is known per se to provide a guiding portion and a guiding recess respectively in the base and the bracket, in order to obtain a relief of the hinge joint. In this connection, in another embodiment of the invention the arcuate guiding portion is to be formed at the base and has at least one arresting portion at the free end thereof which engages behind an arresting shoulder of the guiding recess. The arresting shoulder and the arresting portion must be dimensioned in such a way that the bracket may be sufficiently opened to allow the placement of an article. If, for some reason, the hinge joint breaks, the bracket on the basis of the co-operation between the arresting portion and the arresting shoulder is yet retained at the socket, so that a further holding effect is available and the accommodated article thus cannot drop out or downward.

The holder according to the invention may be fastened at the support member through different structures, for instance, with the aid of spreading feet or the like. The base may also be pasted to a support member. This is dependent on the place and the material of the support member, for instance, a sheet metal member in the body of an automotive vehicle. This is furthermore dependent on whether, and in what way, apertures may be configured. In this connection in another embodiment of the invention the base has a shoe on its underside, which co-operates with a channel-shaped recess of a fastening element and may be fixed at the fastening element in arresting engagement. The fastening element may be of any structure. What is essential to the invention is that the fastening element and the holder are two separate members which are adapted to be brought together and arrested with respect to each other by the shoe and the channel-shaped recess. It appears clear that the shoe may also be shaped at the fastening element and the channel-shaped recess at the underside of the socket. The arresting engagement according to another embodiment of the invention preferably is effected by a tongue formed at the shoe which is provided at the free end thereof with an arresting nose engaging an edge of the fastening element.

The invention will be explained in the following in more detail by way of drawings.

FIG. 3 shows a sectional view of a fastening element to fasten the holder according to FIGS. 1 and 2.

FIG. 4 shows another embodiment for a fastening element.

FIG. 5 shows a third embodiment for a fastening element.

FIG. 6 shows a fourth embodiment for a fastening element.

FIG. 7 shows a top plan view of one of the fastening elements, for instance, according to FIG. 6.

Figure 1:
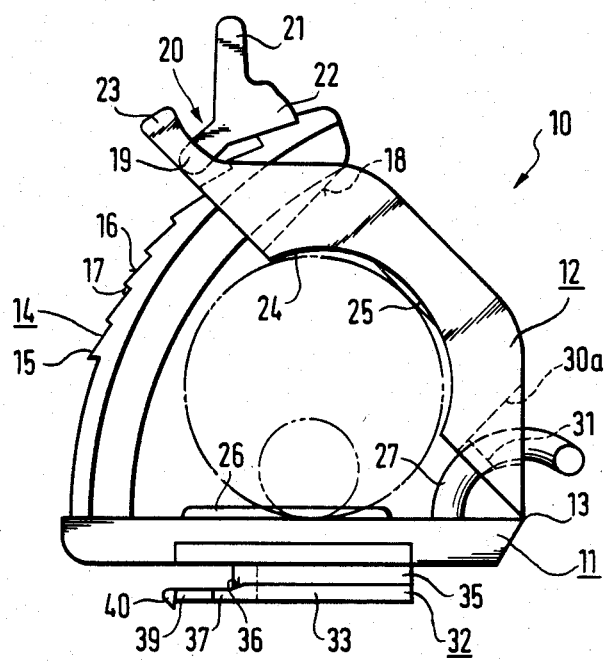
FIG. 1 shows a diagrammatic side view of a holder according to the invention.

Prior to enlarging on the individual representations shown in the drawings it is to be stated that each of the Figures described is of inventively essential importance by itself or in connection with features of the claims.

The holder designated generally with 10 comprises a base 11 and a bracket 12. The bracket 12 is pivotally connected to the base 11 as at 13 via a film hinge. The base 11 is an elongated parallelepipedal structural member, while the bracket 11 is formed approximately in a U-shape. Formed integrally with the base 11 at the opposite end thereof is a tooth segment 14. The tooth segment is circularly shaped, with the toothing 15 formed on the outside surface. The individual teeth of the toothing 15 have one long side wall 16 and one short side wall 17. The arcuate tooth segment 14 is passed through an opening at the free end of the bracket. The opening is indicated at 18 by dashed lines. The opening is sufficiently dimensioned for the tooth segment 14 to be freely passed through the opening 18 with any angular position of the bracket 12. The opening 18 is closed towards the end by a web 19 which has a pawl lever 20 formed integrally therewith which extends upward (in FIG. 1) approximately in parallel with the axis of the opening 18. The pawl lever 20 comprises a handling means 21 and an arresting tooth 22 disposed in opposite arrangement with respect thereto. The arresting tooth 22 is shaped in such a manner as to be configured approximately complementary to the gap between adjacent teeth of the toothing of the tooth segment 14. Formed integrally with the web 19 on the side opposite the opening 18 is another handling means 23.

The inner contour of the bracket 12 is arcuate as indicated at 24. Formed on one side of the arcuate recess 24 is an elevated edge 25. On the upper surface of the socket 11 there is likewise formed an elevated edge 26 which, however, extends on the opposite side from the edge 25.

Figure 2:
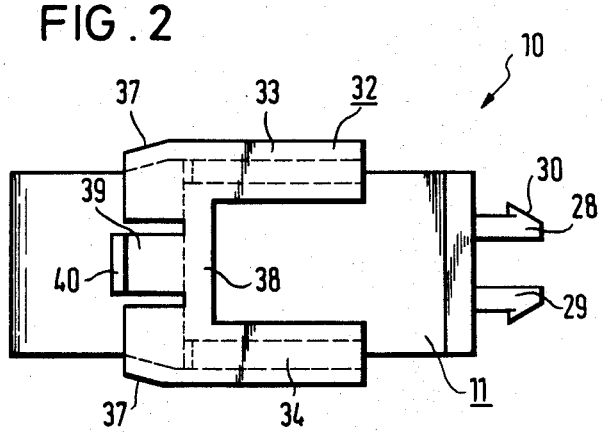
FIG. 2 shows a bottom plan view of the holder according to FIG. 1.

Formed integrally on the upper surface of the base 11 adjacent the pivotal connection of the bracket 12 and base 11 is a circularly shaped guiding projection 27 which is bifurcated at the ends thereof as to be seen in FIG. 2, having prongs 28, 29. The prongs have outward pointing arresting noses 30. The guiding projection 27 is passed through a recess 30a in the bracket 12 indicated in dashed lines. Situated in countersunk arrangement within the recess 30a are two arresting shoulders opposite each other, as indicated by the dashed line 31. The arresting shoulders 31 are arranged such that they cooperate with the arresting noses 30a of the prongs 28, 29, when the bracket is pivoted into the fully opened position, i.e. in a clockwise sense.

Formed integrally at the underside of the base 11 is a shoe 32 consisting of two portions 33, 34 of approximately L-shaped sectional configuration. The channel 35 formed by the L-shaped portions 33, 34 with the underside of the base 11 respectively points outward. The lower transverse webs of the L-shaped portions 33, 34 are provided with a shoulder 36 at one end thereof. They are furthermore tapered inward as at 37 at this end. Formed between the L-shaped portions 33, 34 which are interconnected by a web 38 is a tongue 39 which is connected to be freely pivotable at the web 38. It comprises a downward pointing arresting nose 40.

FIGS. 3 to 6 show different fastening elements which it is not intended to enlarge upon in detail. The fastening element according to FIG. 3 serves for threading in into a hole with a flange 41 engaging below the edge of the opening. The fastening element according to FIG. 4 comprises a shank 42 which is configured cylindrically outside and square within and which is provided with an elongated slot 43.

FIG. 5 shows a fastening element with a spreading foot 44 and a flange 45 in the shape of a tapered ring.

The fastening element according to FIG. 6 comprises a plate 47 with an underside adhesive layer 48.

All the fastening elements own in common the feature that they have two parallel portions 49, 50 on the upper surface thereof which are L-shaped in cross section and the channels 51 thereof which are formed with the upper surface of the fastening elements are pointing inward and are facing each other. The channels 51 are shaped complementary with respect to the transverse webs of the L-shaped portions 33, 34, thus having at the one end thereof also an upper taper as indicated at 52 and an inward pointing taper 53 as indicated in FIG. 7 in dashed lines. The portions 33, 34 thus may be pushed into the channels 51, until the tapered portions 36, 37 get into engagement with the tapers 52, 53 thus limiting the movement of pushing-in. With such a movement of pushing-in the arresting tooth 40 of the tongue 39 slides on the smooth surface 54 between the L-shaped portions 49, 50. In the position of abutment as described the arresting nose 40 gets into arresting engagement behind the edge 55. The holder 10 and the fastening element are thereby detachably interlocked with respect to each other.

The closed space between the bracket 12 and the base 11 as well as the tooth segment 14 serves for the accommodation of elongated articles such as cables or bundles of cables. For mounting, there are various possible modes. One of them perhaps consists in first assembling together the cable holder 10 and the fastening element approximately according to FIGS. 3 to 6 and subsequently fastening them as a unit at an support, for instance, in a hole of an automobile body sheet metal member or the like. Subsequently, the elongated article is then placed in the open reception space through a backward pivotal movement of the bracket 12. Thereafter, the bracket 12 is pivoted in closing direction, i.e. counter-clockwise according to FIG. 1, so that the tooth segment 14 passes through the opening 18. The arresting tooth 22 slides on the flat tooth side walls 16 and likewise gets into arresting engagement in the individual tooth gaps one after the other, until the accommodated article sufficiently resists the further pivotal movement of the bracket 12. FIG. 1 indicates in dash-dotted lines the limiting diameters the accommodated articles may have in order to be effectively fixed within the holder 10. It will be seen that the holder 10 may be employed for articles of the most different diameters.

If the article is to be removed, the arresting tooth 22 is pivotally moved out of the tooth gap by seizing the handling means 21 and pivoting the pawl lever 20. The web 19 in this operation serves as a torsion spring which also causes a corresponding bias of the arresting tooth 22 in the direction of the tooth gap.

Another alternative of mounting consists in first mounting the fastening element and subsequently fixing the holder at the fastening element. In many cases it is easier for the man only to fasten the fastening element at the support. In the subsequent operation of mounting the holder 10 at the fastening element it may already surround the article to be accommodated. Alternatively, the article may be placed-in only after the holder 10 has been mounted at the fastening element.

We claim:
1. A one-piece clamp device for fixing elongated articles comprising:
 a base portion having a means for connecting said base portion to a support member on one side thereof;
 an upstanding bracket located on the side opposite to said one side of said base portion and at one end thereof;
 a first hinge means for continuously pivotally connecting said upstanding bracket to said one end of said base portion;
 an upstanding toothed member integral with said base portion on its side opposite said means for connecting at its end opposite said bracket having several teeth integrally formed on one of its sides;
 means for engaging said teeth on the distal end of said bracket; and
 a second auxiliary hinge means for continuously pivotally connecting said bracket to said one end of said base and for providing a fixed stop of said bracket in its open position.

2. The device of claim 1, wherein said first hinge means is a film or living hinge and said second hinge means further comprises two upstanding curved arms integrally formed with said base proximate to and on the same side of said base as said bracket which engages with the backside of an aperture formed in the proximal end of said bracket to provide additional hinging in the event of failure of said first hinge means; said two curved arms extending outwardly of said aperture and each having an enlarged end to provide said fixed stop.

3. The device of claim 1, wherein said means for engaging comprises arcuate holding means formed in said bracket for engagement with said teeth and further having guide receiving means for receiving a guide means of said toothed member for properly aligning said toothed member within said arcuate holding means.

4. The device of claim 3, wherein said toothed member further comprises a pawl lever member integral with its distal end for disengaging said teeth from said arcuate holding means.

5. The device of claim 1, wherein said means for connecting further comprises a first fastening member designed to engage a support member and a second fastening member integral with said base portion for engagement with and being detachable from said first fastening member.

* * * * *